G. E. FAUCHER.
BEET HARVESTER.
APPLICATION FILED SEPT. 30, 1913.
1,300,362.
Patented Apr. 15, 1919.
6 SHEETS—SHEET 1.
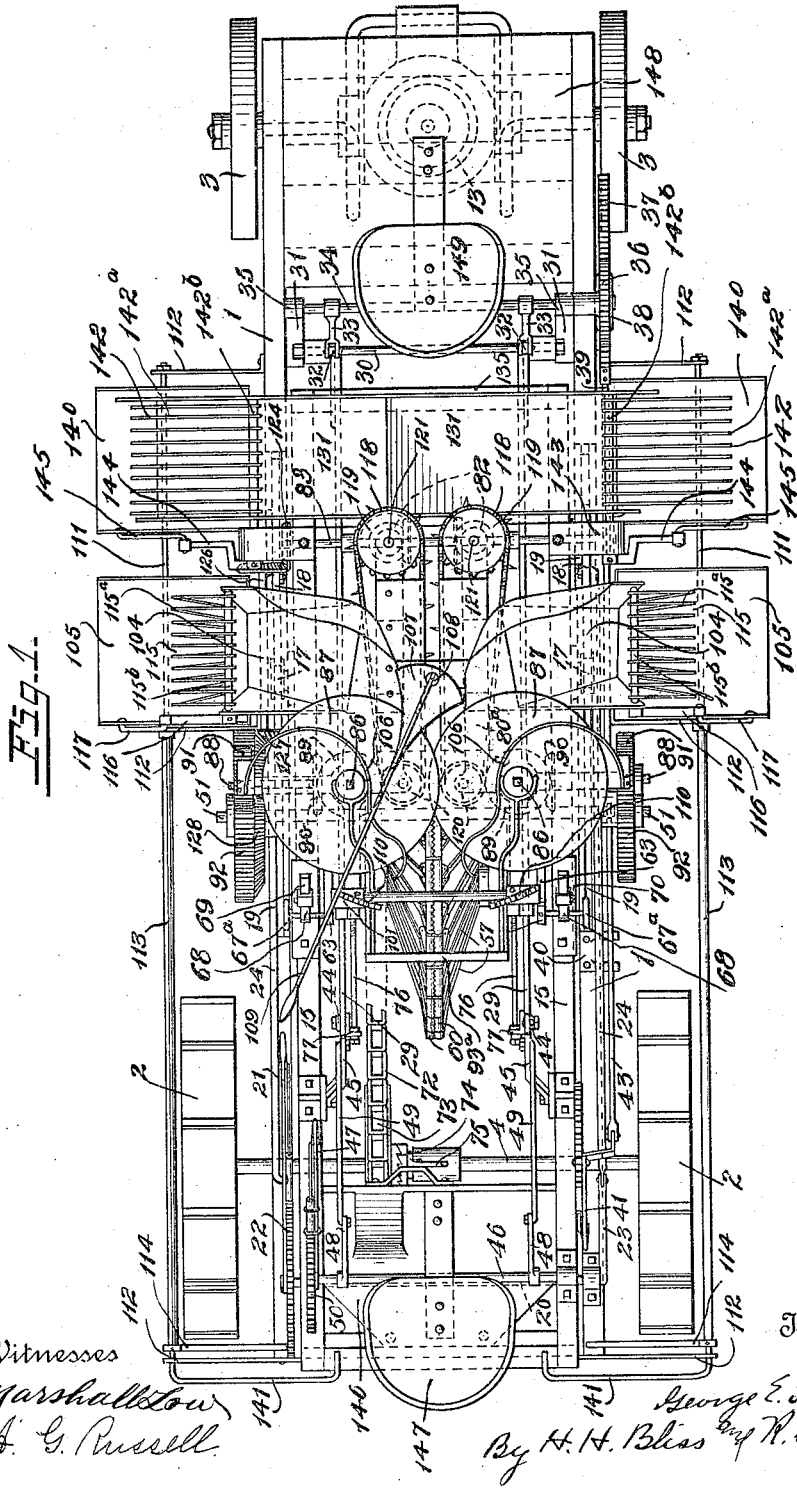

G. E. FAUCHER.
BEET HARVESTER.
APPLICATION FILED SEPT. 30, 1913.
1,300,362.
Patented Apr. 15, 1919.
6 SHEETS—SHEET 2.
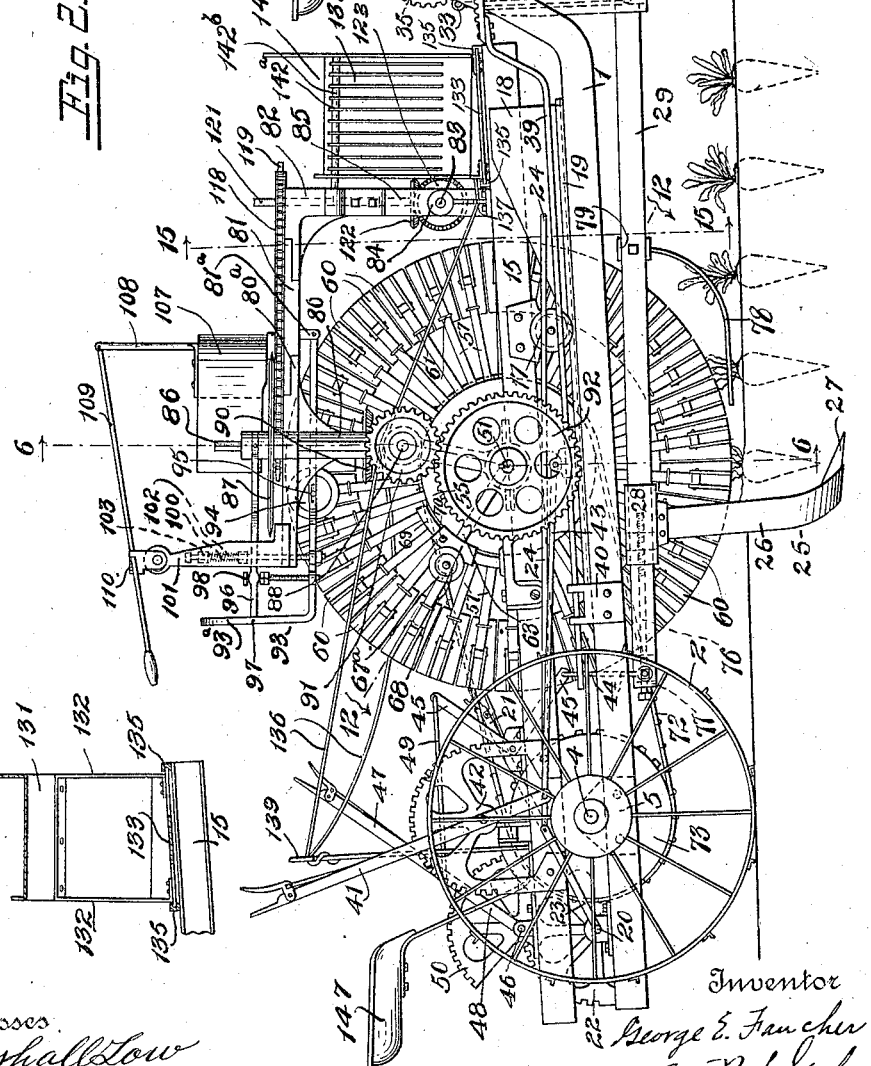
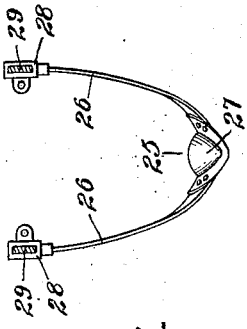
Witnesses
Marshall Low
A. G. Russell
Inventor
George E. Faucher
By H. H. Bliss and R. S. Lehr
Attorneys

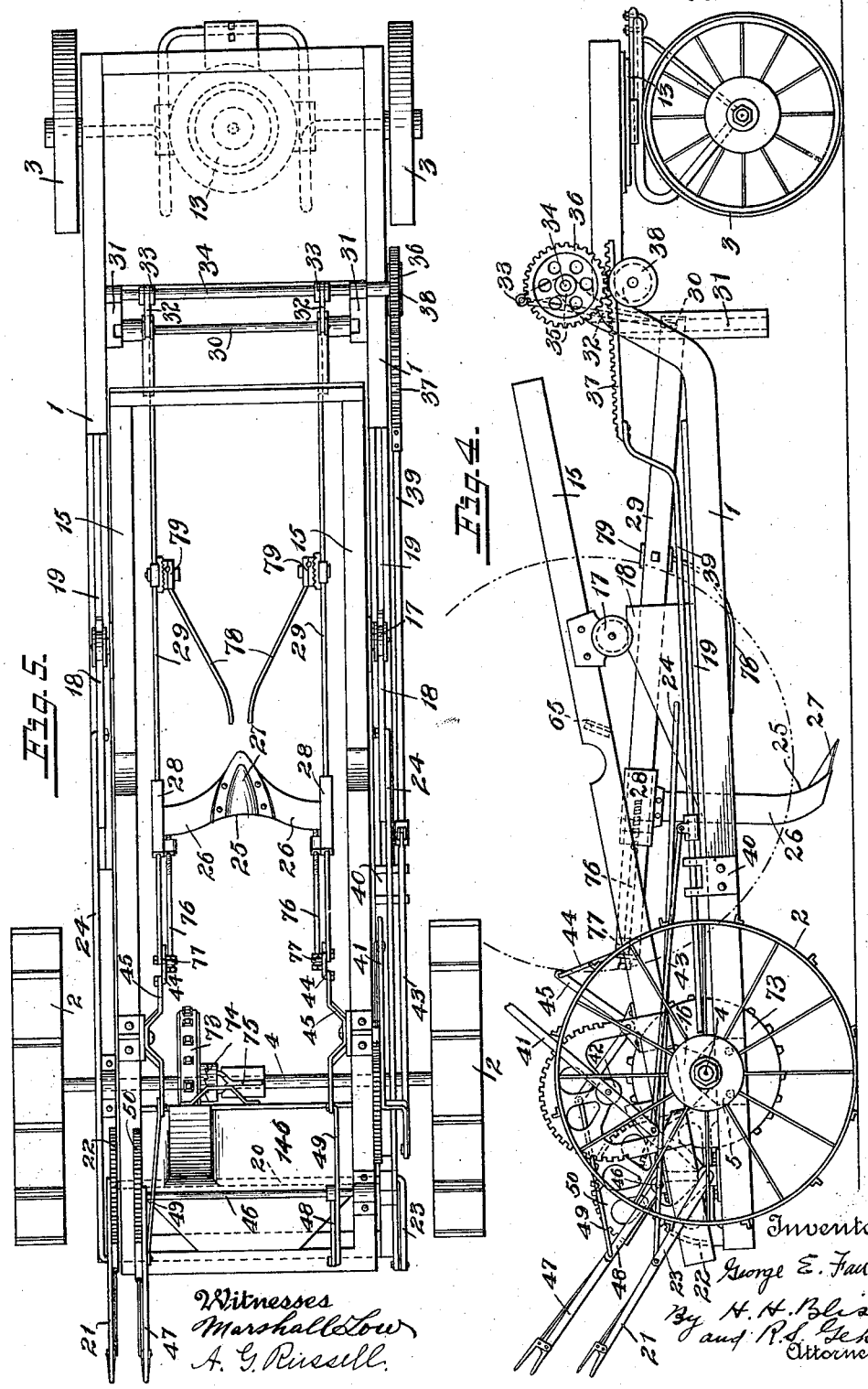

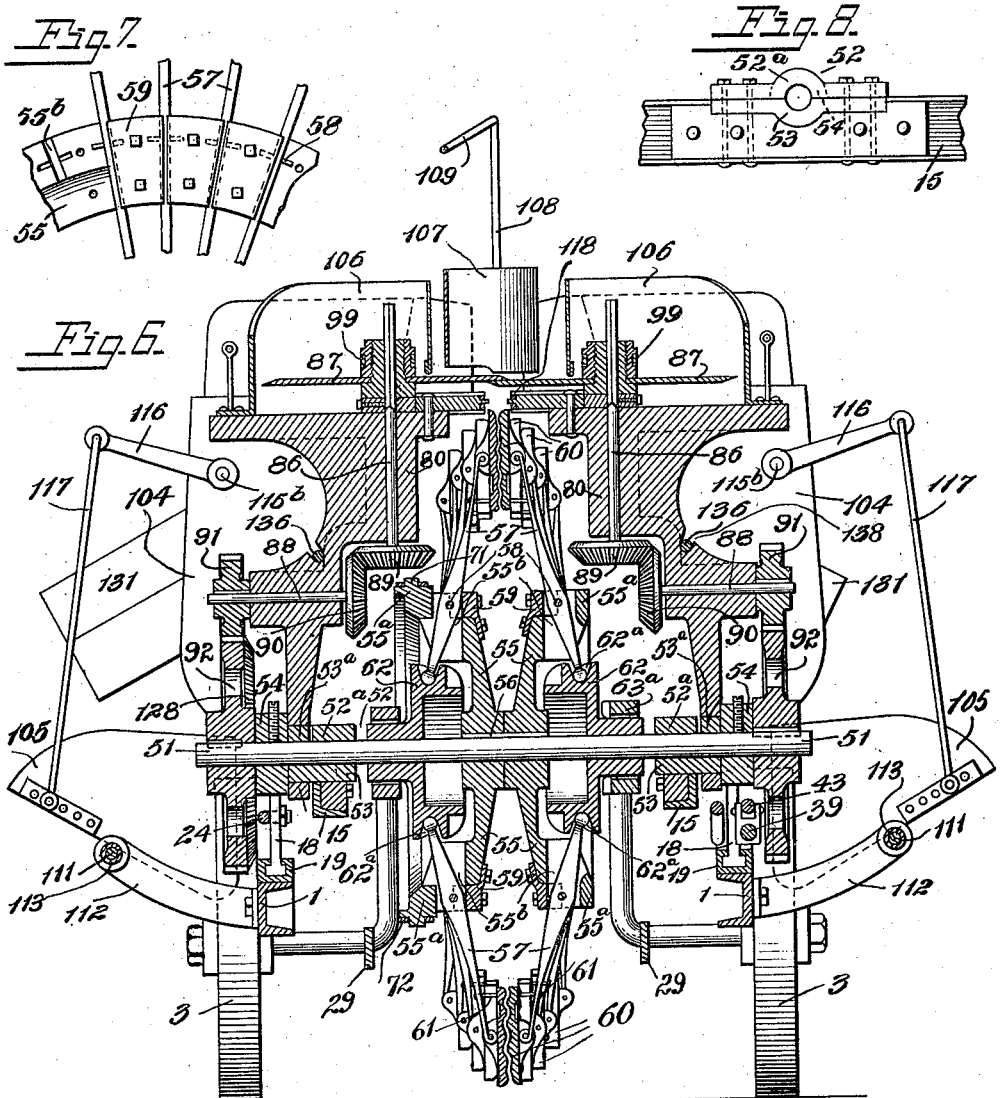

G. E. FAUCHER.
BEET HARVESTER.
APPLICATION FILED SEPT. 30, 1913.
1,300,362.
Patented Apr. 15, 1919.
6 SHEETS—SHEET 5.
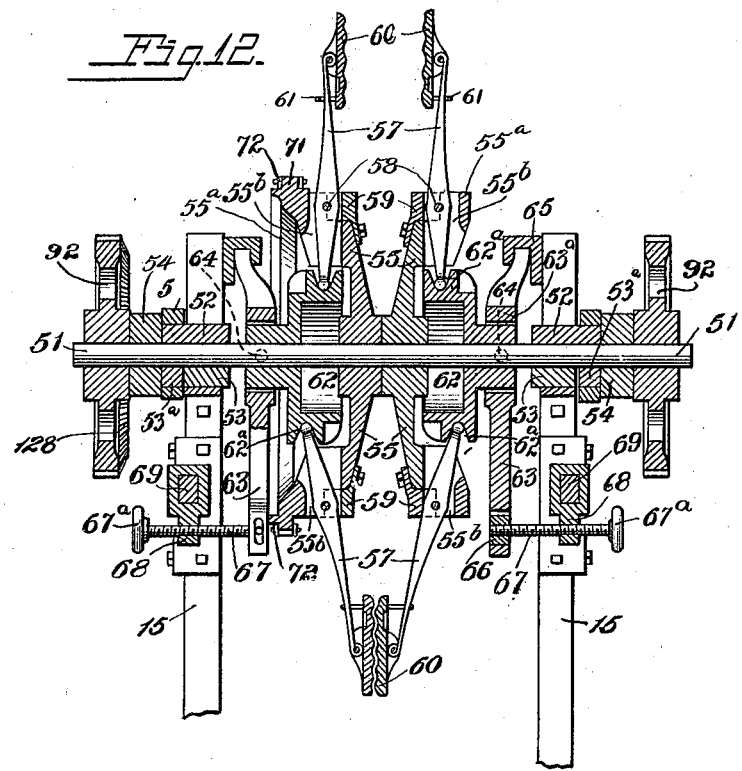
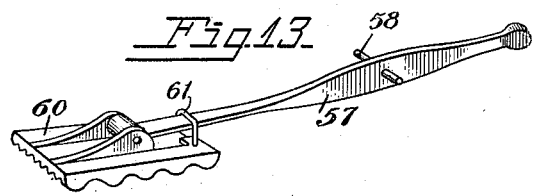
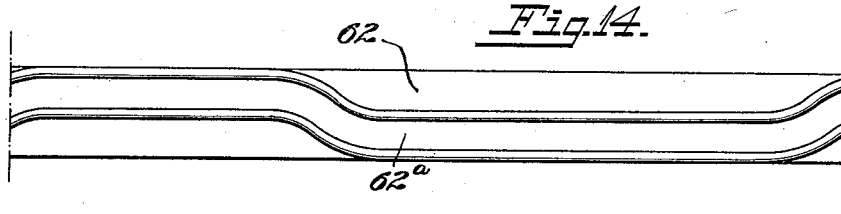

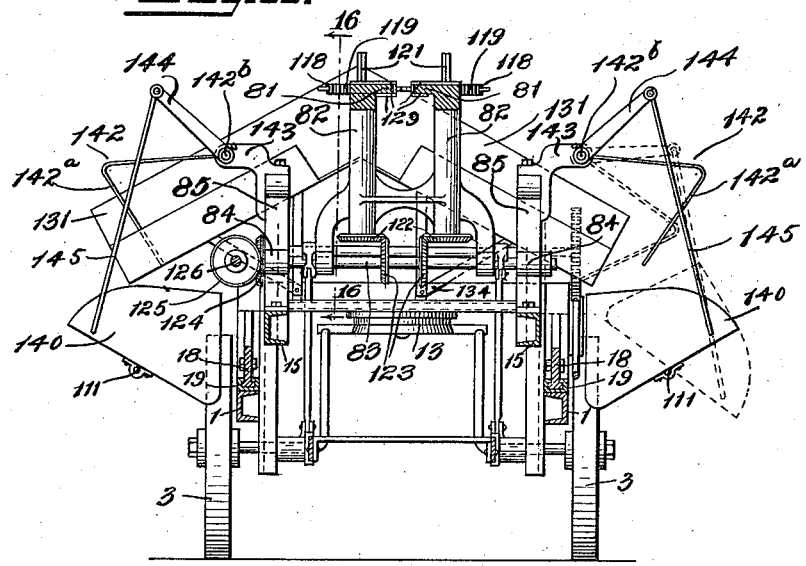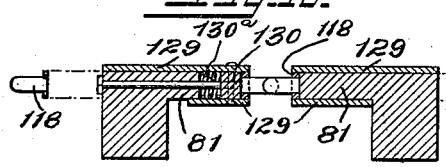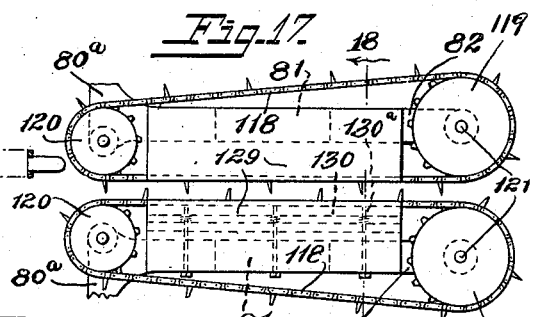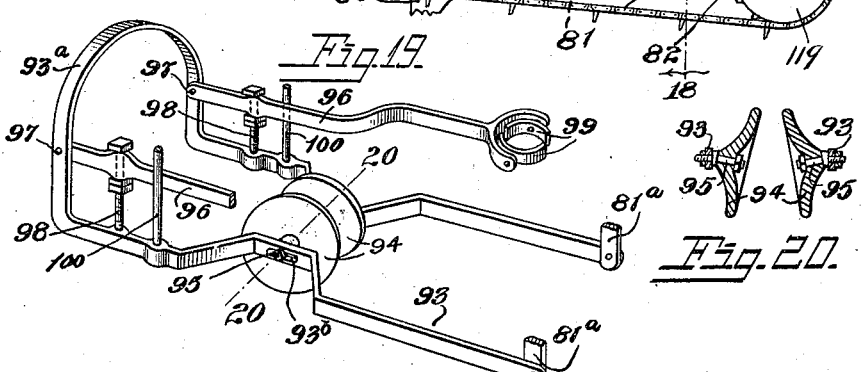

UNITED STATES PATENT OFFICE.

GEORGE E. FAUCHER, OF BEEVILLE, TEXAS.

BEET-HARVESTER.

1,300,362.   Specification of Letters Patent.   Patented Apr. 15, 1919.

Application filed September 30, 1913. Serial No. 792,588.

*To all whom it may concern:*

Be it known that I, GEORGE E. FAUCHER, a citizen of the United States, residing at Beeville, in the county of Bee and State of Texas, have invented a certain new and useful Beet-Harvester, of which the following is a specification.

This invention relates to machines adapted to pull the beets from the ground and sever the tops from the bodies of the beets, leaving the latter in condition for the operations of extracting their contained sugar.

A general object of the invention is the provision of a machine adapted to successfully perform the functions of pulling the beets and of topping them under the varying conditions of their growth.

A further object of the invention is the provision of means for separately delivering the tops and bodies of the beets in such a manner that they can readily be gathered and removed from the field.

Another object of the invention is the provision of a machine of the character referred to in which all of the various operations upon the beets can be constantly observed by the machine operator from the position which he occupies in the operation of the machine.

The foregoing objects and various others incidental or ancillary to them, as well as the manner in which they are attained, will be made clear by the following description in connection with the accompanying drawings in which, for the purpose of illustration, I show a preferred embodiment of my invention.

In the drawings:

Figure 1 is a plan view of a machine embodying my invention.

Fig. 2 is a side elevation of the machine as shown in Fig. 1, except that the chutes through which the bodies of the beets are delivered, and the carrier buckets into which the bodies of the beets and the tops are discharged from the delivery chutes, are omitted to permit illustration of other parts.

Fig. 3 is a detail view showing the soil loosening plow in front elevation.

Fig. 4 is a side elevation of the main or wheel frame, the auxiliary frame on which many of the working parts are mounted, the soil loosening plow and its supporting frame, and the various devices for adjusting the said frames and parts in relation to each other, the auxiliary frame and plow frame being shown in the positions to which they are lifted when the machine is not in operation.

Fig. 5 is a plan view of the parts shown in Fig. 4.

Fig. 6 is an enlarged section taken on the line 6—6 of Fig. 2.

Fig. 7 is a fragmentary view showing some of the details of construction.

Fig. 8 is a detail view showing an inside elevation of one of the bearings supporting the shaft of the puller wheel.

Fig. 9 is a detail view showing the adjustable mounting of one of the front wheels.

Fig. 10 is a detail view showing the adjustable mounting of the rear wheels and the pawl and ratchet connections between said wheels and the shaft or axle on which they are mounted.

Fig. 11 is a section on the line 11—11 of Fig. 10.

Fig. 12 is an enlarged section on the line 12—12 of Fig. 2.

Fig. 13 is a detail perspective view of one of the gripper arms and shoes of the puller wheel.

Fig. 14 is a development of one of the cams which actuates the gripper arms.

Fig. 15 is a section taken on the line 15—15 of Fig. 2.

Fig. 16 is a detail view showing the delivery chute for the beet tops and its supporting devices in vertical section.

Fig. 17 is a detail plan view of the endless chain conveyer which carries the beet tops from the puller wheel and delivers them into the discharge chute.

Fig. 18 is a section taken on the line 18—18 of Fig. 17.

Fig. 19 is a detail perspective view of the devices for automatically adjusting the cutters.

Fig. 20 is a central section through the gage wheels 94, 94, taken on the line 20—20 in Fig. 19.

Referring in detail to the construction illustrated, 1 is a rectangular wheel frame supported at its rear end on driving wheels 2, 2, and at its front end on steering wheels 3, 3. 4 is a driving axle mounted in bearings 5 carried by the side bars of the wheel frame 1, and on this axle the driving wheels 2, 2 are mounted. As shown in Figs. 10 and 11, each of the drive wheels 2, 2 is mounted to turn freely upon the axle 4 but carries a pawl 6 which engages a ratchet wheel 7 carried by a flanged collar 8. This collar is made fast on the axle 4 by means of a pin 9 and hence the forward rotation of the wheels is transmitted through the pawls and ratchet to drive the axle while the wheels are free to turn in relation to each other. The drive wheel is held in operative relation with the flanged collar 8 by a collar 10 secured to the axle by a pin 11. The axle at each end is formed with a series of perforations 12, 12 to receive the securing pins 9 and 11 so that the driving wheels can be adjusted inward and outward to adapt the machine for work on rows spaced at various distances.

The steering wheels 3, 3 are carried by a suitable fifth wheel structure, designated as an entirety by 13, and the front end of the wheel frame 1 is raised, as shown in Figs. 2 and 4, to permit the front wheels to swing freely under the frame so that the machine can be turned in the smallest possible space. As shown in Fig. 9, the front wheel axle carries a series of spacing rings 14 and by moving these from the inner to the outer side of the hubs of the wheels 3, or vice versa, the latter can be adjusted inward or outward for the purpose referred to in connection with the drive wheels. The steering wheels can be provided with any suitable steering pole or tongue and any suitable draft devices; these I have not shown as any form of such devices can be employed. 15 is a rectangular auxiliary frame adjustably mounted on the wheel frame 1. As shown, the frame 15 has bearings 16 by which the rear end of said frame is swingably supported upon the driving axle 4. 17, 17 are grooved rollers mounted on the side bars of the frame 15 near the forward end of said frame, and the rollers rest upon cams 18, 18, which are slidably mounted in guides 19, 19, carried by the side bars of the wheel frame 1. 20 is a rock shaft mounted on the rear end of the wheel frame transversely thereof, having at one end a hand lever 21 which coöperates with the segmental locking rack 22 and at its other end a lever arm 23 in angular alinement with the hand lever 21. Said hand lever 21 and lever arm 23 are connected by means of links 24, 24 with the slidably mounted cams 18, 18, and by shifting the hand lever 21 the cams 18 can be moved forward and backward to lower and raise the auxiliary frame 15.

25 designates as an entirety a plow which is designed to pass under and on two sides of the beets so as to loosen the soil around them, and also to sever the tap roots of the beets. This plow comprises a main U-shaped part 26 and a point or share 27 detachably secured to the part 26. The two arms of the U-shaped part 26 are secured at their upper ends to castings 28, 28 which are slidably mounted upon longitudinal frame bars 29, 29. These latter bars are connected at their front ends by a transverse rod or bar 30 which has its ends slidably mounted in upright guides 31, 31 carried by the wheel frame. The bar 30 is adjustably supported in the upright guides 31 by links 32, 32 which are connected at their upper ends to crank arms 33, 33 carried by a transverse shaft 34. This latter shaft is rotatably mounted in bearings 35, 35 carried by the wheel frame 1, and on one end of the shaft 34 is mounted a gear wheel 36. A rack 37 is supported in operative engagement with the gear wheel 36 by a grooved idler wheel 38 mounted on the wheel frame 1. A rearward extending rod 39 is rigidly secured to the rear end of the rack 37 and is slidably mounted in a bracket 40 carried by the wheel frame. 41 is a hand lever mounted upon a bracket 42 which is carried by the auxiliary frame 15 and is provided with a segmental locking rack to secure the hand lever in adjusted position. The lower end of the hand lever 41 is connected by a link 43 with the rack rod 39 so that the rack 37 can be moved forward and backward by shifting the hand lever 41. It will be seen that such movement of the rack 37 rotates the gear 37 and causes the lowering and raising of the front end of the plow supporting frame.

The bars 29 of the plow frame are supported at their rear ends by links 44, 44 which are connected at their upper ends to bell crank levers 45, 45 mounted on the frame 15. 46 is a rock shaft mounted transversely on the frame 15 carrying at one end a hand lever 47 and at its other end a lever arm 48. Said hand lever and lever arm are connected by links 49, 49 with the respective bell crank levers 45 and by means of the hand lever 47 the rear end of the plow frame can, therefore, be raised and lowered. A locking rack 50 is formed for the hand lever 47 so that it can be secured in any desired position.

The plow 25, which has been described, is designed to loosen the soil around the beets so that they can be pulled more easily. In connection with this plow I provide devices for grasping the beets, lifting or pulling them from the soil and moving them into engagement with devices which sever the tops from the bodies. Referring now to the devices which grasp the beets and lift them from the ground, 51 is a supporting and driving shaft arranged transversely of the frame 15 (see Fig. 6), and rotatably mounted in bearings carried by the side bars 15 and designated as entireties by 52, 52. Each of these bearings comprises a bottom section 53 and a top or cap section 52ª. 54, 54 are thrust collars fast on the drive shaft 51 and abutting against the bearings 52 so as to prevent endwise movement of said shaft 51. 55, 55 are disk-like hubs mounted on the shaft 51 near the middle thereof and rigidly secured thereto by a key 56. The disks 55 are formed with outwardly turned rim parts 55ª and these rim parts are formed with a series of radially extending slots 55ᵇ to receive a series of radially extending gripper arms 57, 57. The gripper arms 57 are mounted upon pivot pins 58 which are clamped between the peripheral parts of the disks 55 and detachable clips 59. On the outer ends of the arms 57 are pivotally mounted gripper shoes 60, 60. These shoes preferably have their inner adjacent faces serrated, as shown, and are provided with loops 61 which embrace the arms 57 so as to limit the pivotal movement of each shoe relative to its supporting arm. The arms 57 are made of spring material, preferably spring steel, the inner ends of the arms preferably being of such shape and weight as to be rigid, while the outer ends are flattened sufficiently so that they act as springs, the object being to press the grippers 60 yieldingly and resiliently together.

62, 62 are circular cams mounted on the drive shaft 51 but secured against rotation therewith. Each of these cams 62 is formed at its periphery with a groove 62ª into which the inner ends of the gripper arms 57 project so that said arms are swung as the disks carrying them turn with the shaft 51, the cams being so designed that the grippers 60 are moved toward each other as they swing downward and rearward, being pressed together as they reach a point approximately directly beneath the drive shaft 51, and being so held as they swing rearward and upward and then forward and upward until they reach a point approximately directly above the driving shaft 51 whereupon they are moved apart and continue separated from each other until they approach the aforesaid point approximately directly beneath the drive shaft 51.

The mechanism, operating as last described, is designed to grasp the tops of the beets as the puller wheel turns with the advance of the machine, lift the beets by their tops and swing them upward to a point approximately directly above the drive shaft 51 where they come into operative engagement with cutting devices which will presently be described. It is important that the grippers 60 should close upon the beet tops at the right point in their travel and that they should be pressed together with a suitable force great enough to insure the firm holding of the top but not so great as to crush the tops. To insure such a result, I provide the following devices for adjusting and holding each of the cams 62.

63 is a lever which is formed with a ring 63ª to pass over the hub of the cam 62, being pivotally secured to said hub by pivot pins or trunnions 64, 64. The forward end of the lever 63 has a fulcrum support consisting of a bracket 65 which is secured to the side bar of the frame 15 and which is formed with an arcuate slot concentric with the drive shaft 51. Thus mounted, the lever 63 can be moved inward and outward to shift the cam 62 axially on the drive shaft 51, thus varying the force with which the grippers 60 are pressed together as the puller wheel rotates, and said lever can also be swung upward and downward around the axis of the drive shaft 51, thus moving the cam angularly about the axis of the said shaft so as to shift the points at which the grippers are closed and opened, respectively.

The following devices are provided for actuating the lever 63 and securing it in adjusted position. 66 is a nut pivotally mounted in the forked end of the lever 63, and 67 is a screw having threaded engagement with said nut and rotatably mounted in a support 68 which is slidably mounted upon an arcuate bracket 69 carried by the frame 15. The screw 67 is provided with a hand wheel 67ª and, being held against axial movement relative to the support 68, is adapted by its rotation to swing the lever 63 inward and outward and to hold it in any desired position. By sliding the support 68 upward and downward on the bracket 69, the lever 63 can be correspondingly swung upward and downward, and can be secured in any desired position by means of set screw 70.

The left hand disk 55 of the puller wheel has formed on its periphery a sprocket wheel 71 which coöperates with and is driven by a sprocket chain 72 that is in turn driven by a sprocket wheel 73 rotatably mounted on the driving axle 4. A toothed clutch 74, operated by a hand lever 75, is interposed between the sprocket wheel 73 and the driving axle 4 and by means of it the driving gear can readily be thrown into and out of operation. The ratio of the diameters of the sprocket wheels 71 and 73 is such that the puller wheel is driven at a peripheral speed such as it would have if it rolled on the ground. In other words, its peripheral speed is the same as that of the drive wheels 2.

It will be observed, on referring to Fig. 2, that the soil loosening plow 25 is disposed directly beneath the center of the puller wheel, the relative arrangement of the plow and said wheel being such that the grippers 60 are caused to move together and grasp the top of a beet just when the plow is about to begin to loosen the soil around the body of said beet. It is important that these two functions, i. e., that of grasping the top of the beet and that of loosening the soil around the beet so that it can be readily extracted from the soil, should be properly timed in relation to each other, for if the soil is loosened and disturbed before the tops are grasped by the puller wheel, it will be difficult or impossible for the puller wheel to grasp the beets fairly so as best to pull them and so as to insure that they be held in a uniform manner in relation to the cutters or topping devices presently to be described. As previously stated, the plow 25 is adjustably mounted on the frame bars 29. Such mounting is provided so that the plow can be adjusted forward and backward until an adjustment is secured in the case of any particular soil, such that the loosening of the soil is effected at the proper time in relation to the grasping of the beet tops by the puller wheel to facilitate the extracting of the beet without disturbing its position prior to the grasping of the beet tops by the grippers 60. To facilitate the adjustment of the plow, I provide screw bolts 76, 76 having threaded engagement at their forward ends with the castings 28, 28, and being supported at their rear ends in brackets 77, 77 carried by the frame bars 29, 29. The screws 76 are held against endwise movement by the brackets 77 so that the plow 25 can readily be adjusted forward and backward by simply rotating the screws 76.

In connection with the adjustment of the plow forward and backward, it will be observed that the angular adjustment of the cams 62 in the manner hereinbefore described, varies the point at which the grippers in their movement are caused to grasp the beet tops and that, therefore, the adjustment of the plow forward and backward and the angular adjustment of the cams must be made with regard to each other, in order to secure the uniform action upon the beets mentioned above.

To facilitate and insure the entrance of the beet tops between the grippers 60 in such a manner that the latter can properly close upon them, I provide guide bars 78, 78. These bars are secured at their forward ends to the plow frame bars 29 by means of rose plate clamping devices 79, 79, which permit the bars to be adjusted up and down around their front ends. It will be observed on reference to Figs. 2, 4 and 5 that these bars are curved downward and inward from their front ends in such a manner as to lift and support the tops of the beets and hold them in an upright position at the points where the grippers 60 close upon them.

In connection with the puller wheel I provide mechanism and devices for severing the tops from the bodies of the beets and delivering the tops and beets separately from each other. This mechanism and these devices are mounted in part upon a framework which comprises frame castings 80, 80 which are mounted at their lower ends upon cylindrical bosses or extensions 53$^a$, 53$^a$ of the bottom parts 53 of the drive shaft bearings 52. These frame castings 80 have forward extensions 80$^a$, 80$^a$ which are rigidly connected by means of bars 81, 81 to an upright frame casting 82. The frame casting 82 is mounted at its lower end upon a transverse shaft 83 which is rotatably supported in bearings 84, 84 carried by upright brackets 85, 85 mounted on the frame 15 (see Figs. 2, 6 and 15).

In the frame castings 80, 80 are rotatably mounted upright shafts 86, 86. On the upper ends of these shafts are mounted disk cutters 87, 87. These cutters are rotated by the shafts but are free to rise and fall relative to the shafts, the upper ends of the shafts being, in the construction shown, squared for this purpose. 88, 88 are transmission shafts mounted in the castings 80, 80 at right angles to the shafts 86, and by means of bevel gears 89 and 90 these shafts are operatively connected to the shafts 86 and by means of spur gears 91 and 92 are connected to the main drive shaft 51 so that the rotation of the latter is transmitted to the upright cutter shafts 86.

It will be understod that in the operation of the machine the puller wheel as it rotates carries the beets which it has extracted from the soil upward and forward into engagement with the cutters 87, 87 so that the upstanding body of the beet is severed from the crown and the tops proper which are grasped by the grippers 60 of the wheel. As the puller wheel thus carries the beets upward to the cutters, it continues to firmly hold the beet tops as they were initially grasped and, inasmuch as the loosening of the soil is timed so as to insure the uniform grasping of the tops while the beets are still standing in their upright position of growth, it will be seen that a uniform presentation of the beets to the cutters is also insured.

It will be understood that the crown part of the beet bodies contains little or no sugar and that it is desirable to separate this part from the rest of the beet which is to be subjected to the process of sugar extraction. It is also true that the beets vary in size and shape to some extent. For these reasons the cutters 87 are mounted, as above described, with freedom to rise and fall in order that they may be adjusted upward and downward so as to sever a suitable part of the crowns of the beets from the bodies thereof. I effect this adjustment of the cutters automatically by means of the following devices.

93 designates as an entirety a movable frame having side arms which are pivoted at their front ends on depending lugs 81ᵃ, 81ᵃ, carried by the frame parts 81, 81, and having an intermediate part 93ᵃ which connects the rear ends of the side arms and is arched over the puller wheel. 94, 94 are gage wheels or rollers mounted on the side arms of the frame 93 in such positions that their upper peripheries are adapted to press upward against the crowns of the beets when the latter are coming into engagement with the cutters 87. These gage wheels are mounted upon spindles 95, 95 which are secured in slots 93ᵇ so that the wheels can be adjusted forward and backward. 96, 96 are arms pivoted at 97, 97 to the frame 93 and adjustably secured in relation thereto by screws 98, 98 which have a rotary, non-reciprocating engagement with the arms 96 and a suitable threaded connection with the frame 93. At their forward ends the arms 96 are forked and pivotally connected to rings 99, 99 which slidably engage grooves in the hubs of the disk cutters 87, 87. Each of the side arms of the frame 93 carries an upstanding rod 100 which passes loosely through a guide lug formed on an inverted U-shaped frame 101 which is mounted on the frame castings 80, 80. 102, 102 are springs interposed between the said guide lugs and adjustable nuts 103, 103 on the upper ends of the rods 100. These springs serve to draw the frame 93 upward so that the gage wheels 94 will always press yieldingly against the crowns of the beets. By suitably adjusting the wheels 94, the arms 96 and the tension of the springs 102, the cutters 87 can be caused to automatically take a suitable position for severing the beets as the latter come successively into engagement with the gage wheels 94.

When the bodies of the beets have been severed from the tops, they are supported on the cutter disks and carried forward by the rotation of said disks and discharged from the front peripheries thereof. In front of the cutters 87 are downwardly and laterally inclined chutes 104, 104 which are fixedly supported on the frame parts. These chutes are designed to receive the bodies of the beets discharged from the cutters and deliver them into carrier buckets 105, 105. 106, 106 are upright curved deflector plates which insure the discharge of the beet bodies from the fronts of the cutters 87, and 107 is a deflector gate mounted on a pivot 108 near its forward end and adapted to have its rear end swung so as to direct the severed beets into the right hand chute 104 or into the left hand chute 104, it being understood that it is desirable to deliver the beets from the side of the machine toward the harvested part of the field. The gate 107 is provided with a rearwardly extending hand lever 109 by means of which it can be swung, and this lever can be secured in adjusted position by toothed segments 110, 110 mounted on the U-shaped frame 101.

The buckets 105, 105 are rotatably mounted on longitudinal shafts 111, 111, these shafts being rotatably supported in brackets 112, 112 carried by the wheel frame 1. Tubular shafts 113, 113 are mounted on the rear parts of the shafts 111 and each of these tubular shafts is connected at its forward end to one of the buckets 105 and at its rearward end carries a hand lever 114 by which it can be turned so as to tip the bucket 105 and discharge the beets. The buckets 105 are so shaped and mounted that the weight of the beets tends to hold them in their normal position.

115, 115 are gates each consisting of a series of fingers 115ᵃ carried by a shaft 115ᵇ which is pivotally mounted in the sides of chute 104. Each of the shafts 115ᵇ carries at its rear end a lever arm 116 which has its free end connected by a link 117 with the adjacent bucket 105. The arrangement is such that when the bucket 105 is tipped to discharge the beets, the gate fingers 115ᵃ are turned downward to close the chute and prevent the passage of beets until the bucket has been returned to normal position.

To accomplish the suitable handling and delivery of the severed tops and beet crowns when they are released from the puller wheel, I provide the following devices. 118, 118 are endless conveyer chains which pass at the front end of their paths over drive sprockets 119, 119 and at the rear ends of their paths over idler sprockets 120, 120. The idler sprockets 120 are mounted on the frame castings 80, 80, and the drive sprockets 119, 119 are mounted on upright shafts 121, 121 which are rotatably supported in the frame casting 82. The shafts 121, 121 carry bevel gears 122, 122 at their lower ends which mesh with bevel gears 123, 123 carried by the transverse shaft 83 (see Fig. 15). This shaft carries at its left end a bevel gear 124 which meshes with a similar gear 125 on a longitudinal shaft 126 which is suitably mounted in bearings carried by the auxiliary frame 15. At its rear end this shaft 126 carries a bevel pinion 127 which meshes with bevel gear teeth 128 formed on the adjacent gear wheel 92 (see Figs. 1, 6 and 12). By means of these connections the conveyer sprockets 119 are driven from the main drive shaft 51 which carries the gear 92.

The inner adjacent runs of the conveyer chains 118 are supported and guided between plates 129, 129 secured to the frame bars 81, 81. In the case of the left hand conveyer chain, the inner edge of the frame bar 81 forms a backing for the inner run of the chain while, in the case of the right hand conveyer chain, a separate backing strip 130 is provided and this is pressed yieldingly inward by a series of springs designated by the numeral 130ª (see Fig. 18).

The conveyer chains 118 are arranged in relation to the puller wheel in such manner that they receive and grip the tops of the beets as the latter are released from the grippers 60 of the puller wheel. The springs 130ª press one of the conveyer chains yieldingly toward the other and insure a firm grip upon the tops while the teeth or fingers of the conveyer chains insure the forward movement of the tops with the chains. As the tops arrive at the front ends of the flights of the conveyer chains they are discharged upon one of two delivery chutes 131, 131.

The two chutes last referred to extend downward and laterally, one to one side of the machine and the other to the other side of the machine. They join at their inner ends and form a unitary structure which is movable as an entirety laterally of the machine so that the tops can be discharged from the chain conveyers either into the right hand chute or the left hand chute. In Fig. 1 the chutes are shown shifted to the left so that the tops are delivered into the right hand chute. The chutes proper are supported by upright frames 132, 132 which are carried by a base plate 133, and by brace bars 134, 134 which extend from the lower parts of the chutes to the upright frames 132, 132. The base plate 133 is slidably supported in channel bars 135, 135 secured to the frame 15. A rope 136 is secured intermediate its ends to the base plate 133 or other part of the chute structure, and has each of its two ends extended laterally over a guide 137 carried by one of the brackets 85, thence rearward and over a guide 138 carried by the frame casting 80 to a fastening post 139 on the rear end of the frame 15. By pulling on the right hand section of the rope 136, the operator can shift the chutes 131 to the right, and by pulling on the left hand section of the rope, said chutes can be shifted to the left.

The chutes 131 are designed and arranged to deliver the beet tops into buckets 140, 140 which are mounted, one at each side of the machine, on the shafts 111, 111 so as to turn therewith. The shafts 111, 111 have lever arms 141, 141 at their rear ends by which they can be turned to dump the buckets 140, 140.

142, 142 are gates arranged to control the chutes 131, 131. Each of these gates consists of a series of fingers 142ª carried by a shaft 142ᵇ rotatably mounted in a laterally extending bracket 143 which is mounted on the upright bracket 85. A lever arm 144 is secured to the rear end of the shaft 142ᵇ and has its free end connected by link 145 with the adjacent bucket 140. When the latter is tipped to dump and discharge the beet tops, the gate 142 is simultaneously closed (see Fig. 15) so as to prevent discharge of beet tops from the chute 131 until the bucket is returned to its normal position.

The auxiliary frame 15 is provided at its rear end with a platform 146 and on this platform is mounted a seat 147 for the operator of the machine. The wheel frame is provided at its front end with a platform 148 and on this platform is mounted a seat 149 for the driver.

The operation of my improved harvester will now be readily understood. As the machine enters the field, the auxiliary frame 15 and the plow 25 are in their uppermost positions, as indicated in Fig. 4, so that all of the working parts are free of the ground and the clutch 74 is, of course, disengaged. On arriving at the first row to be worked, the operator first sets the deflector gate 107 and the chutes 131 so that the beet bodies and tops will be discharged to one side or the other according to the circumstances of the case. Let it be assumed that these parts are set, as shown in Fig. 1, so as to discharge the beet bodies and tops on the right side of the machine. Next, the operator lowers the front end of the plow frame by throwing the hand lever 41 rearward thereby pitching the plow frame downward so that it will readily take into the soil. Then, as the machine advances, he lowers the rear end of the plow frame by swinging the lever 47 forward. The plow having been set at a suitable depth, the operator throws the hand lever 21 forward so as to move the cams 18 forward and lower the frame 15 which carries the puller wheel and cutters. The clutch 74 is thereupon thrown into engagement thus causing the rotation of the puller wheel and of the cutters, and the driving of the chain conveyers.

As the machine advances the guide bars 78 serve to lift and guide the tops of the beets so that they are directed between the grippers 60 of the puller wheel permitting the latter to close upon the tops and grip them firmly. Just as the grippers are closing upon the tops of the beet, the plow 25 is beginning to pass under the beet, and, having first severed the tap root, the share 27 and the cross connecting part to which it is secured being inclined upwardly and rearwardly, serve to lift and loosen the soil so that the beet is readily extracted from the soil as it is drawn upward by the rotation of the puller wheel.

The grippers 60 are held in firm engagement with the beet tops by the cams 62, 62 as the beet moves upward and rearward and then upward and forward. As the beet approaches the highest point of the puller wheel, it moves in inverted position into engagement with the gage wheels 94 which ride upon the crown of the beet and cause the disk cutters 87, 87 to be adjusted to a suitable height for severing the tops and crown from the body of the beet. The severed body of the beet is carried forward by the rotation of the cutters and discharged into the right hand chute 104 which in turn delivers it into the right hand bucket 105. On reference to Fig. 2 it will be noted that the disk cutters incline forward somewhat and this facilitates the forward discharge of the beet bodies into the chute 104.

While the body of the beet is being discharged from the cutters, the tops thereof are being grasped by the conveyer chains 118, 118, and simultaneously the cams 62, 62 begin to separate the grippers 60 so that the tops are free to move forward between the conveyer chains. The tops are discharged from said chains upon the right hand chute 131, which, in turn, delivers the tops into the right hand bucket 140. As the rotation of the puller wheel continues, the grippers are held apart by the cams during the movement of the grippers downward and forward, and then downward and rearward until they approach the lowest point of the wheel whereupon the cams begin again to press them together in the manner previously described. Thus, the operation of loosening the soil, grasping the beets, lifting them, moving them upward into engagement with the cutters, severing the tops from the bodies, and delivering the severed bodies and tops separately into carrier buckets, goes on continuously as the machine advances.

As the operation of the machine begins, the machine operator will be able to observe the manner in which the machine is performing its various functions and can quickly make any adjustment of the parts that may be desirable. For example, he may observe that the grippers do not close upon the beets at quite the right point in the movement of the wheel and, in that case, he will make a suitable angular adjustment of the cams 62, 62. Or he may find that the action of the plow in loosening the soil around the beet is a little too early or a little too late for a proper coöperation with the puller wheel. In such case he will proceed to adjust the plow forward or backward as the case may be by means of the devices provided for that purpose. Again, the operator may find that the grippers press the beet tops too hard, or, on the other hand, that they do not press the tops hard enough to hold them firmly; whereupon he can, by means of the hand wheels 67ª, adjust the cams 62 inward or outward to secure the desired action of the grippers. Again, the operator may find that the gage wheels 94 need adjustment forward or backward, or that the arms 96 need adjustment upward or downward to secure a proper gaging of the cutters.

These various adjustments, having once been made to meet the conditions of the soil and the character of the beets, will need little change as the work proceeds.

The buckets 105 and 140 will gradually fill with the beet bodies and tops, respectively, as the machine advances and, when they have filled, the machine operator can readily dump them by throwing the hand levers 114, 141, respectively. And it will be understood that as the machine works back and forth across the field, the beets and tops can be dropped in rows so as to facilitate the gathering of them.

When the machine reaches the end of the row, the operator will first lift the frame 15, then elevate the front end of the plow frame, and next the rear end thereof, so as to bring the working parts clear of the ground and permit the driver to turn the machine upon the next row. While the driver is bringing the machine around on the next row, the operator shifts the deflector gate 107 to the right so that the beets will be discharged into the left chute 104, and also shifts the chutes 131 to the right so that the beet tops will be discharged into the left hand chute, thus securing the delivery of the beets on the side of the machine away from the unharvested part of the field. As the machine enters the next row, the operator lowers the plow, and the frame 15 which carries the puller wheel and other parts in the manner previously described, and the work proceeds as before.

It will be observed that practically all parts of the machine can be controlled from the rear end thereof, and, furthermore, that the operator, in his seat on the rear end of the machine, is able to continuously observe the operation of all parts of the machine, the advantage of which will readily be appreciated.

While, in the preferred form of my invention, I provide pulling means adapted to grasp the tops of the beets, it should be understood that the novel relations existing between the puller and the peculiarly arranged soil loosener and between these parts and the topping devices, are not dependent, in their broadest aspect, upon the use of a puller of the top-grasping type. Therefore in some of the claims which follow, I describe the pulling means in terms that can appropriately be applied to devices adapted to grasp any part of the beet.

In describing my improved harvesting machine, I refer to it as a beet harvester because it is especially adapted for the harvesting of beets, but, inasmuch as some, at least, of my improvements may be found useful in connection with machines for harvesting other vegetables, I do not limit my invention to beet harvesters.

What I claim is:—

1. In a beet harvester, the combination with a wheel supported frame, of means for grasping the beets and pulling them out of the soil, and means for loosening the soil around the beets which is constructed and arranged to begin the loosening of the soil around each beet after the said pulling means has grasped the beet and by the time it has begun to pull the beet.

2. In a beet harvester, the combination with a wheel supported frame, of means for grasping the beet tops and pulling the beets out of the soil, and means for loosening the soil around the beets which is constructed and arranged to begin the loosening of the soil around each beet after the said pulling means has grasped the tops of said beet and by the time it has begun to pull the beet.

3. In a beet harvester, the combination with a wheel supported frame, of means for grasping the beet tops and pulling the beets out of the soil, and a plow for loosening the soil around the beets which is constructed and arranged to begin the loosening of the soil around each beet after the said pulling means has grasped the tops thereof and by the time it has begun to pull the beet, said plow being adjustable forward and backward relative to the pulling means.

4. In a beet harvester, the combination with a wheel supported frame, of means for grasping the beet tops and pulling the beets out of the soil, a plow for loosening the soil around the beets which is constructed and arranged to begin the loosening of the soil around each beet after the first named means has grasped the tops thereof and by the time it has begun to pull the beet, and manual devices for adjusting the plow forward and backward relative to the pulling means.

5. In a beet harvester, the combination with a wheel supported frame, of means for grasping the beet tops and pulling the beets out of the soil, means for guiding the beet tops to said grasping and pulling means, and a plow for loosening the soil around the beets which is constructed and arranged to begin the loosening of the soil around each beet after the said pulling means has grasped the tops thereof and by the time it has begun to pull the beet.

6. In a beet harvester, the combination with a wheel supported frame, of means for grasping the beet tops and pulling the beets out of the soil, means for loosening the soil around the beets which is constructed and arranged to begin the loosening of the soil around each beet after the said pulling means has grasped the tops thereof and by the time it has begun to pull the beet, and means for severing the bodies from the tops of the beets while they are still held as initially grasped by the said pulling means.

7. In a beet harvester, the combination with a wheel supported frame, of a rotary puller wheel having two opposed series of gripper arms, relatively stationary endless cams for closing and opening the outer ends of opposite arms of the puller wheel to successively grasp and release the tops of the beets, and means for augularly adjusting the cams to vary the times of the closing and opening of the gripper arms.

8. In a beet harvester, the combination with a wheel supported frame, of a rotary puller wheel having two opposed series of gripper arms, relatively stationary endless cams for closing and opening the outer ends of opposite arms of the puller wheel to successively grasp and release the tops of the beets, a plow beneath the puller wheel for loosening the soil around each beet while it is being pulled, and means for angularly adjusting the cams to vary the times of the closing and opening of the gripper arms.

9. In a beet harvester, the combination with a wheel supported frame, of a rotary puller wheel having two opposed series of gripper arms, relatively stationary endless cams for closing and opening the outer ends of opposite arms of the puller wheel to successively grasp and release the tops of the beets, a plow beneath the puller wheel for loosening the soil around each beet while it is being pulled, means for adjusting said plow forward and backward relative to the puller wheels, and means for angularly adjusting the cams to vary the times of the closing and opening of the gripper arms.

10. In a beet harvester, the combination with a wheel supported frame, of a rotary puller wheel having two opposed series of radially arranged gripper arms, plate-like gripper shoes pivotally mounted on the outer ends of said arms, and means for swinging said gripper arms toward and from each other to cause the gripper shoes to successively grasp and release the beet tops as the wheel turns.

11. In a beet harvester, the combination with a wheel supported frame, of a rotary puller wheel having two opposed series of radially arranged gripper arms, plate-like gripper shoes pivotally mounted on the outer ends of said arms, means for limiting the pivotal movement of the gripper shoes relative to the arms, and means for swinging said gripper arms toward and from each other to cause the gripper shoes to successively grasp and release the beet tops as the wheel turns.

12. In a beet harvester, the combination with a wheel supported frame, of a rotary puller wheel having two opposed series of resilient radially arranged gripper arms, plate-like gripper shoes pivotally mounted on the outer ends of said arms, and means for swinging said gripper arms toward and from each other to cause the gripper shoes successively to yieldingly grasp and to release the beet tops as the wheel turns.

13. In a beet harvester, the combination with a wheel supported frame, of a rotary puller wheel having two opposed series of resilient radially arranged gripper arms, plate-like gripper shoes pivotally mounted on the outer ends of said arms, means for limiting the pivotal movement of the gripper shoes relative to the arms, and means for swinging said gripper arms toward and from each other to cause the gripper shoes successively to yieldingly grasp and to release the beet tops as the wheel turns.

14. In a beet harvester, the combination with a wheel supported frame, of a rotary puller wheel having two opposed series of radially arranged gripper arms, plate-like gripper shoes pivotally mounted on the outer ends of said arms, two circular cams for swinging the gripper arms toward and from each other to cause the gripper shoes to successively grasp and release the beet tops as the wheel turns, and means for varying the distance between the two cams to vary the pressure with which the gripper shoes grasp the beet tops.

15. In a beet harvester, the combination with a wheel supported frame, of means for grasping the beets and pulling them out of the soil, means for loosening the soil around the beets which is constructed and arranged to begin the loosening of the soil around each beet after the said pulling means has grasped the beet and by the time it has began to pull the beet, and means for severing the bodies from the tops of the beets while they are still held as initially grasped by the said pulling means.

16. In a beet harvester, the combination with a wheel supported frame, of means for grasping the beet tops and pulling the beets out of the soil, a plow for loosening the soil around the beets which is constructed and arranged to begin the loosening of the soil around each beet after the said pulling means has grasped the tops thereof and by the time it has begun to pull the beet, said plow being adjustable forward and backward relative to the pulling means, and means for severing the bodies from the tops of the beets while they are still held as initially grasped by the said pulling means.

17. In a beet harvester, the combination with a wheel supported frame, of means for grasping the beet tops and pulling the beets out of the soil, a plow for loosening the soil around the beets which is constructed and arranged to begin the loosening of the soil around each beet after the first named means has grasped the tops thereof and by the time it has begun to pull the beet, manual devices for adjusting the plow forward and backward relative to the pulling means, and means for severing the bodies from the tops of the beets while they are still held as initially grasped by the said pulling means.

18. In a beet harvester, the combination with a wheel supported frame, of means for grasping the beet tops and pulling the beets out of the soil, means for guiding the beet tops to said grasping and pulling means, a plow for loosening the soil around the beets which is constructed and arranged to begin the loosening of the soil around each beet after the said pulling means has grasped the tops thereof and by the time it has begun to pull the beet, and means for severing the bodies from the tops of the beets while they are still held as initially grasped by the said pulling means.

19. In a beet harvester, the combination with a wheel supported frame, of a rotary puller wheel having two opposed series of gripper arms, relatively stationary endless cams for closing and opening the outer ends of opposite arms of the puller wheel to successively grasp and release the tops of the beets, a plow beneath the puller wheel for loosening the soil around each beet while it is being pulled, means for angularly adjusting the cams to vary the times of the closing and opening of the gripper arms, and means for severing the bodies from the tops of the beets while they are still held as initially grasped by the puller wheel.

20. In a beet harvester, the combination with a wheel supported frame, of a rotary puller wheel having two opposed series of gripper arms, relatively stationary endless cams for closing and opening the outer ends of opposite arms of the puller wheel to successively grasp and release the tops of the beets, a plow beneath the puller wheels for loosening the soil around each beet while it is being pulled, means for adjusting said plow forward and backward relative to the puller wheel, means for angularly adjusting the cams to vary the times of the closing and opening of the gripper arms, and means for severing the bodies from the tops of the beets while they are still held as initially grasped by the puller wheel.

21. In a beet harvester, the combination with a wheel supported frame, of means for grasping the beets and pulling them out of the soil, means for loosening the soil around the beets which is constructed and arranged to begin the loosening of the soil around each beet after the said pulling means has grasped the tops thereof and by the time it has begun to pull the beet, means for severing the bodies from the tops of the beets while they are still held as initially grasped by the pulling means, and means for automatically adjusting the severing means relative to the bodies of the beets as the latter are presented to the severing means.

22. In a beet harvester, the combination with a wheel supported frame, of means for grasping the beets and pulling them from the soil, a plow for loosening the soil around the beets constructed and arranged to begin the loosening of the soil around each beet after the pulling means has grasped the beet and by the time it has begun to pull the beet, and means for lowering and raising the plow to and from operative position comprising means for swinging it around a transverse axis close to it to incline it upward and downward, and means for swinging it around a transverse axis relatively distant from it to bodily raise and lower it.

23. In a beet harvester, the combination with a wheel supported frame, of means for grasping the beets and pulling them from the soil, a plow for loosening the soil around the beets constructed and arranged to begin the loosening of the soil around each beet after the said pulling means has grasped the beet and by the time it has begun to pull the beet, an elongated supporting frame for the plow extending longitudinally of the machine, the plow being mounted on the rear part of said frame, means for raising and lowering the front end of the supporting frame, and means for raising and lowering the rear end of said frame.

24. In a beet harvester, the combination with a wheel supported frame, of a rotary puller wheel carrying devices adapted to grasp the beets and pull them from the soil, a plow for loosening the soil around the beets arranged directly beneath the puller wheel, an elongated supporting frame for the plow extending longitudinally of the machine and comprising side bars disposed one on each side of the puller wheel, the plow being mounted on the rear part of said frame, means for raising and lowering the front end of the supporting frame, and means for raising and lowering the rear end of said frame.

In testimony whereof, I affix my signature, in presence of two witnesses.

GEO. E. FAUCHER.

Witnesses:
RICHARD MURPHY,
BERT L. DOUGHERTY.

Copies of this patent may be obtained for five cents each, by addressing the "Commissioner of Patents, Washington, D. C."